April 22, 1969     L. HIDEG     3,439,656
ENGINE FUEL FEED SYSTEM
Filed March 1, 1967
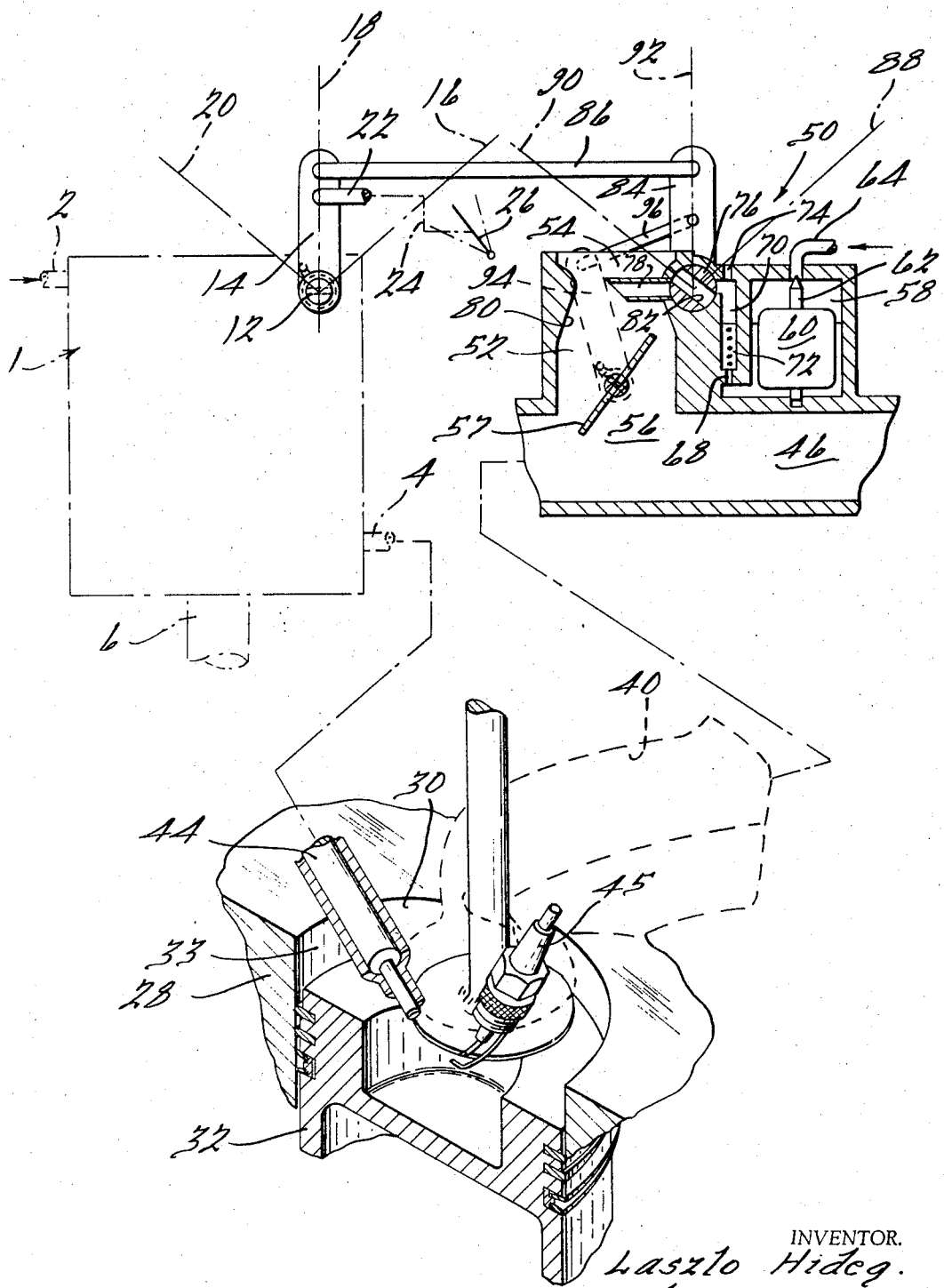
INVENTOR.
Laszlo Hideg.
BY John R. Faulkner
Robert E. McCollum
ATTORNEYS.

3,439,656
ENGINE FUEL FEED SYSTEM
Laszlo Hideg, Dearborn Heights, Mich., assignor to Ford Motor Company, Dearborn, Mich., a corporation of Delaware
Filed Mar. 1, 1967, Ser. No. 619,783
Int. Cl. F02b 11/00
U.S. Cl. 123—32                  8 Claims

ABSTRACT OF THE DISCLOSURE

An internal combustion engine in which fuel from a fuel injection pump is injected directly into the cylinders during the minimum to essentially 60% load range, with quantities varying as a function of the load; beyond this load range, the fuel flow quantity additionally injected remains essentially constant and additional fuel is added in the form of an air-fuel mixture from a carburetor connected to the engine intake manifold. The fuel injection pump fuel control lever is moved by the vehicle accelerator pedal, and is connected to a fuel shut-off valve in the carburetor to provide this overlapping fuel supply action.

---

This invention relates, in general, to a fuel feed system for an internal combustion engine. More particularly, it relates to a fuel system where substantially fixed injection timing can be applied, and one that combines direct fuel injection with air-fuel mixture induction.

The invention relates to an improvement on the internal combustion engine combustion process shown and described in S.N. 490,774, filed Sept. 17, 1965, now Patent No. 3,315,650, Internal Combustion Engine Combustion Process, Irving N. Bishop et al. Patent No. 3,315,650 describes an engine stratified charge combustion process utilizing essentially unthrottled operation and the injection of fuel directly into the combustion chamber over the entire load and speed range, with controlled dispersion and combustion.

While control of the localized air-fuel mixture formation is important at all times in an engine process of the above type, it generally is most critical in the range between minimum load and about 100 p.s.i. IMEP (between 15%–60% load), to prevent misfiring, non-smoking, and short combustion durations. Above 60% load, the injecting timing is not as critical because the mixtures are sufficiently rich to produce short combustion periods even if the mixture is completely dispersed.

Above 60% load, however, relatively long injection durations and substantially advanced injection timing are required to obtain the desired dispersion and combustion as compared to that within the 15%–60% load operating range. These injection advances and extended injection duration requirements tend to complicate the design and increase the cost of the fuel injection equipment. Also, the controls needed to prevent misfiring at high speeds and light load operation further complicate the fuel injection equipment. Such controls generally can be provided only by the use of a separate injection pump plunger for each engine cylinder, or a multi-plunger, positive displacement common rail type pump with a fuel distributor, or a single displacer distributor type pump with an unusually wide range timing unit. The simpler fixed timing type distributor injection pump with, say, a single pump plunger and one helix with as many holes as are engine cylinders, would not satisfy the requirements over the entire load and speed range. It will be seen, therefore, that an injection pump necessary to satisfy the requirements of the combustion process in S.N. 490,-774, is not only complicated, but expensive, and that a large portion of the complexity and expense arises because of the requirements that must be satisfied in the beyond 60% load range.

The invention provides a fuel feed systm that permits the use of the simpler fixed timing distributor type injection pump, for example, by using direct fuel injection over the entire load and speed range of operation, with substantially unchanged injecting timing for maximum load operation, and adding, for maximum load, the remaining required fuel into the intake manifold as an air-fuel mixture.

More specifically, direct fuel injection alone, with varying injection timing, is used up to, say, 60% load operation, the quantity varying with the load, up to a maximum. Beyond this point, fuel continues to be injected, but the quantity remains essentially at a fixed level; however, additional fuel in the form of an air-fuel mixture is gradually added until the required quantity is obtained.

The invention accomplishes the above insofar as the illustrated embodiment is concerned by providing an interconnection between the fue injection pump and a carburetor or charge induction type air-fuel mixture mechanism connected to the engine intake manifold. Below, say, 60% load, the fuel supply mixture from the carburetor is shut off, and only fuel from the injection pump reaches the cylinder combustion chambers. At and beyond 60% load, the fuel control in the carburetor opens progressively to admit progressively increasing quantities of fuel mixture to the air induction passage.

It is an object of the invention, therefore, to provide a fuel feed system for an internal combustion engine that includes direct fuel injection into the engine cylinder as well as manifold enrichment during certain operating phases of the engine.

It is another object of the invention to provide a direct fuel injection system for an internal combustion engine wherein substantially fixed injection timing can be applied by suplementing the fuel supply during increased load operations with an air-fuel mixture.

It is a still further object of the invention to provide an engine fuel feed system consisting of a fuel injection pump that alone satisfies all of the fuel requirements of the engine within the lower load ranges, and above this load range, shares satisfaction of the fuel reauirements with a manifold enrichment device that supplies an air-fuel mixture to the engine cylinders.

Another object of the invention is to provide an engine fuel feed system in which a fuel injection pump is interconnected with a manifold enrichment device in such a manner that within a lower load range, all of the fuel supplied to the engine cylinders is injected directly therein by the fuel injection pump; and above the range, the injection pump output remains essentially constant, that is, with substantially unchanged injecting timing, and the additional or supplemental fuel that is required is added progressively in the form of an air-fuel mixture by manifold enrichment, so that at maximum load there is an overlap of supply of fuel by direct fuel injection into the cylinders and the induction of an air-fuel mixture from the intake manifold.

Other objects, features and advantages of the invention will become apparent upon reference to the succeeding detailed description thereof, and to the drawing illustrating a preferred embodiment thereof, wherein the figure shows, schematically, a cross sectional view of an internal combustion engine cylinder having a fuel feed system embodying the invention.

The figure shows a fixed timing distributor-type fuel injection pump indicated in general by the block 1. Such a pump would be of a known type consisting of, say, a single pump plunger cooperating with a single helix having, say, eight holes each leading to a separate cylinder of an eight cylinder engine. In effect, the pump would comprise a source (plunger) of fluid under pressure feeding fuel to a distributor valve (helix with eight holes) for the predetermined schedule of fuel flow to the various engine cylinders.

The details of construction and operation of this type of distributor pump are known and, therefore, are not given since they are believed to be unnecessary for an understanding of the invention. Suffice it to said that the pump would have a fuel inlet 2, a fuel outlet or discharge 4, and would be driven by a shaft 6 that is connected in a suitable manner to the engine crankshaft. It also would have a rotary fuel flow or supply control valve 12 moved by a lever 14. The fuel lever and valve are mounted for an arcuate swinging movement of approximately 90° between a minimum fuel flow position 16, corresponding to the fuel requirements for engine idle speed operation, for example, a central or median position 18 providing the maximum output flow of fuel from the pump, and a position 20 beyond the maximum flow position. In this case, movement of the fuel lever between the maximum fuel flow position 18 and position 20 constitutes a lost motion movement in which the fuel flow remains essentially constant or fixed at a maximum, thereby providing essentially unchanged injection timing during this interval of movement of the lever. The lever 14, for example, could be loosely journaled on shaft 12 and the two interconnected by a torsion spring. A stop would project into the path of rotation of a projection on shaft 12. Thus, the force of the torsion spring would cause a unitary movement of lever 14 and shaft 12 from and between positions 16 and 18, at which time the shaft projection would engage the stop and be prevented from further counterclockwise rotation. Lever 14, however, could continue to move counterclockwise to the position 20 by overcoming the force of the torsion spring.

As shown, fuel lever 14 is pivotally connected to a lever 22 that is part of a linkage 24 connected to the vehicle accelerator pedal 26. In this case, movement of the accelerator pedal between engine idle and wide-open throttle positions moves fuel lever 14 from position 16 to 18 and then to 20, to supply the engine cylinders with a fuel quantity that varies as a function of the demand.

A typical engine cylinder is shown in the lower portion of the figure. In this case, only a single cylinder is illustrated, to indicate the manner of distributing the fuel to the combustion chamber. It will be clear, however, that any multiple of cylinders or banks of cylinders can be used without departing from the scope of the invention, since an individual injector would be provided for each cylinder, and additional branches of the intake manifold with additional inlet valves would also be provided.

As shown, the single cylinder includes an engine block 28 having a cylinder bore 30 slidably receiving a reciprocating piston 32 to partially define a combustion chamber 33. A cylinder head (not shown) closes the combustion chamber, and is provided with an intake valve 36 and an exhaust valve (not shown), the intake valve being movable in a suitable intake duct or passage 40. A fuel injection nozzle 44 is connected to the outlet 4 of fuel injection pump 1 for spraying fuel directly into combustion chamber 33. A spark ignition device 45 is suitably located to project into the chamber for ignition of the mixture therein.

The intake passage 40 is shown as being connected to an engine intake manifold 46 indicated at the upper right-hand corner of the figure. As stated previously, between minimum and approximately 60% load operation, the varying fuel quantities are supplied to the engine cylinder by fuel injection pump 1 alone, in a manner to be described later. Above the 60% load requirement, the quantity of fuel discharged from the fuel injection pump remains substantially constant. Any additional quantities that are required are supplied as an air-fuel mixture through intake passage 40 in quantities increasing as a function of the increase in the load, and by a manifold enrichment device indicated in general at 50.

Enrichment device 50 in effect is a carburetor that has a main induction passage 52 with a fresh air inlet 54 at one end. The opposite other end 56 is connected to intake manifold 46, and flow through passage 52 is controlled by a conventionally mounted throttle valve 57. The carburetor for the most part is of a conventional construction. It includes a float bowl 58 containing a float 60 having a vertically movable needle valve 62 to control supply of fuel through an inlet 64, in a known manner. The inlet, in this case, preferably would be connected to a transfer pump that supplies fuel to the inlet 4 of the injection pump 1.

The fuel flow from bowl 58 is controlled by an enrichment orifice 68 connected to a main fuel well 70. The fuel well contains the normal emulsion tube 72, and has an air bleed orifice 74 connected to it to mix air with the fuel in the tube for stratifying or atomizing the fuel prior to its entry into the main induction passage 52, in a known manner. The main well 70 is connected through a flow control valve 76 to a fuel nozzle 78 that projects into induction passage 52. The nozzle in this case projects into the low pressure section of a venturi 80 formed in induction passage 52.

Valve 76 contains a central flow passage 82, and is rotatably mounted so as to be movable between one extreme position, not shown, vertically positioning passage 82 and completely blocking any flow of fuel from float bowl 58 to nozzle 78, and an essentially horizontal position essentially aligning passage 82 with the fuel nozzle 78 and fuel well 70 to thereby permit a flow of fuel into passage 52 by suction of the air flow past fuel nozzle 78, in a known manner.

Fixed to valve 76 is a lever 84 that has essentially a 90° arcuate movement similar to the movement of pump control lever 14. It is pivotally connected to pump lever 14 by a link 86. Lever 84 moves between a position 88 in which the flow control valve passage 82 is vertically disposed, to the position 90, in which passage 82 is essentially horizontally disposed. In the median position 92, lever 84 locates passage 82 as shown, at a point where it is ready to crack open to permit fuel flow from well 70 to nozzle 78. In this position, the fuel injection pump lever 14 is at its maximum fuel delivery position. When lever 84 is in position 88, lever 14 is in the minimum fuel pump flow position. These two positions correspond essentially to the fuel requirements between minimum and approximately 60% load, so that when levers 14 and 84 are moved counterclockwise beyond positions 18 and 92, respectively, the delivery of fuel from pump 1 will remain substantially constant. However, additional fuel will now be supplied to the engine combustion chamber through the flow valve 76, passage 52, manifolds 46 and 40, and past valve 36.

Throttle valves 57, in this instance is used only for engine idle speed operation, to control the air flow. It is connected by linkage 94 and 96 to the fuel flow control lever 84 in such a manner (as by lost motion mechanisms, now shown) so that the movement of the lever from its minimum position 88 towards its maximum position 90 immediately moves the throttle valve from a throttling position towards a wide-open position. As the case of lever 14, the link 94 would be journaled on the shaft of butterfly valve 57, and the two would be interconnected by a torsion spring surrounding the shaft, one end secured to the shaft, and the opposite end secured to link 94. The mechanical advantage between the link 94 and lever 84 would be such that a small movement of lever 84 would cause a greater movement of link 94. The carburetor passage 52 would contain a stop in the path of pivotal movement of valve 57. Thus, initial movement of lever 84 from position 88 would simultaneously move valve 57 from its minimum open position towards wide open position. As soon as valve 57 contacted the stop, link 94 could continue to rotate by virtue of the torsion spring interconnection.

It should be noted, that, in this particular embodiment, venturi 80 is not necessary for the induction of the additional fuel into the combustion chamber. This is because the supply of this additional fuel occurs generally only during higher engine speeds, and therefore, the air flow through induction passage 52 is sufficient to cause the required pressure differential between passage 52 and the pressure in float bowl 58 to effect flow of fuel into the induction passage. The venturi, therefore, could be eliminated if desired.

From the above, it will be clear that up to approximately 60% maximum load conditions of operation, progressive depression of the accelerator pedal 26 will cause simultaneous movement of fuel flow control levers 14 and 84 progressively between the positions 16 and 20, and 88 and 90. Until lever 14 rotates past position 18, only fuel from pump 1 will be supplied through nozzle 44 to combustion chamber 33, since during this time, the manifold enrichment flow control valve 76 will be in a position blocking flow of fuel from bowl 58. Subsequently, if the accelerator pedal is further depresesd, indicating a demand for more fuel, the two levers 14 and 82 will move counterclockwise simultaneously past positions 18 and 92 so that lever 84 cracks open valve passage 82 and begins supplying an additional air-fuel mixture to the engine combustion chamber. Insofar as pump 1 is concerned, the output of fuel now remains substantially at a constant or unchanged level; that is, movement of lever 14 from position 18 to 20 works essentially no change in the quantity of fuel being delivered by the pump. Thus, between 60% and maximum load conditions, the fuel enrichment device will provide increasing quantities of additional fuel in the form of an air-fuel mixture to the engine cylinders.

From the foregoing, therefore, it will be seen that the invention provides a fuel feed system for an internal combustion engine that permits the use of a relatively simple type of fuel injection pump for satisfying the major portion of the fuel requirements of the engine, and that an additional manifold enrichment device supplies additional fuel in the form of an airfuel mixture to the engine combustion chamber when the load conditions demand it. Such a construction provides several advantages; namely, it permits full air utilization at maximum load without substantial air swirl due to the manner of the intake of additional fuel; secondly, it permits full air utilization in engines where the shape of the combustion chamber does not permit the fuel spray to impregnate the full air charge; thirdly, it permits full air utilization at maximum load without advancing the injection at high loads and also at high speeds; and, it provides correct engine operation at all engine loads without using a separate injection pump plunger unit for each engine cylinder; that is, simplified distributor type pumps with one or two plungers can be used because the required duration of injection is substantially reduced. It will be seen, therefore, that the invention provides a less complex and less expensive fuel feed system than one utilizing direct fuel injection only throughout the entire load and speed range of operation.

While the invention has been described and illustrated in its preferred embodiment, it will be clear to those skilled in the arts to which the invention pertains that many changes and modifications may be made thereto without departing from the scope of the invention.

I claim:

1. A fuel feed system for an internal combustion engine having a combustion chamber and an intake manifold connected thereto, comprising, a fuel injection pump having a fuel outlet connected to said combustion chamber and a movable fuel flow control lever operatively connected to said pump to control the flow of fuel therefrom, said lever having a first range of movement effecting discharge of fuel from a minimum quantity to a maximum as a function of the movement of said lever within the range, said lever having a second range of movement beyond the first range wherein the fuel discharge remains essentially at a constant level, an air passage connected to said intake manifold and having throttling valve means movable thereacross from an idle position throttling the air intake to an off idle air unthrottling position to control the initial flow of air therethrough, a second fuel flow control valve operatively associated with said latter passage and movable between positions blocking or variably supplying fuel to said passage, and means operatively connecting said lever and throttle and control valve for a unitary movement to schedule flow of fuel first from said pump alone to said combustion chamber and an unthrottled supply of air thereto during the first range of movement of said lever and valves, and a concurrent supply to said chamber of fuel from said pump and an air-fuel mixture from said manifold during the second range of movement of said lever and valve.

2. A fuel feed system as in claim 1, said passage comprising the induction passage of a carburetor having an air inlet to said passage and a fuel feed conduit communicating with said passage, said second valve being located in said conduit to control the flow therethrough.

3. A fuel feed system as in claim 1, including a second lever fixed to said second valve and pivotally connected to said first lever, and said first and second levers each being arranged to provide flow of fuel during one portion of its movement.

4. A fuel feed system as in claim 3, said portions overlapping at times to provide both for the flow of fuel to said chamber from said pump and at the same time a flow of an airfuel mixture from said manifold.

5. A combination fuel injection and manifold enrichment fuel feed system for an internal combustion engine having a combustion chamber and an intake manifold connected thereto, comprising, a fuel injection pump having an inlet containing fuel, an outlet connected to said combustion chamber, and a fuel flow scheduling lever operatively located between said inlet and outlet and movable between minimum and maximum fuel flow positions and therebeyond, said lever having a first range of movement effecting discharge of fuel from a minimum quantity to a maximum as a function of the movement of said lever within the range, said lever having a second range of movement beyond the first range wherein the fuel discharge remains essentially at a constant level, movable engine accelerator pedal operated means connected to said lever for movement thereof to control the supply of fuel to said combustion chamber, second fuel inlet means containing fuel, and an intake manifold enrichment device including, an air induction passage connected to said intake manifold and having throttle valve means variably movable across said passage from an idle position throttling the air intake to an off idle air unthrottling position to control flow therethrough, a source of air connected to said passage, conduit means operatively connecting the fuel from said second inlet means to said passage, fuel flow control means in said conduit means and movable between fuel supply and fuel flow blocking positions and therebeyond to control the flow of fuel to said passage, and means operatively connecting said fuel lever and throttle valve and said fuel flow control means for concurrent movement upon movement of said accelerator pedal operated means to schedule flow of fuel first from said pump alone to said combustion chamber and an unthrottled supply of air thereto during the first range of movement of said lever and valves, and simultaneously supply fuel and air-fuel mixture to said combustion chamber respectively from both said pump and said intake manifold during the second range of movement of said lever and valves.

6. A fuel feed system as in claim 5, said fuel flow control means including a valve in said conduit means movable variably between positions blocking or permitting fuel flow through said conduit means.

7. A fuel feed system as in claim 6, including an actuating link fixed to said valve in said conduit means and pivotally connected to said lever and throttle valve means for movement of said latter valve by said fuel pump lever.

8. A fuel feed system as in claim 7, said scheduling lever being so constructed and arranged so as to effect the supply of an essentially constant quantity of fuel upon movement of the lever beyond its maximum flow position, said link being so connected to said valve as to preclude flow of fuel to said passage through said valve until said scheduling lever is moved beyond its maximum flow position.

References Cited

UNITED STATES PATENTS

| | | |
|---|---|---|
| 1,504,322 | 8/1924 | Brush. |
| 2,400,247 | 5/1946 | Miller et al. |
| 2,544,978 | 3/1951 | Blessing et al. |
| 2,758,576 | 8/1956 | Schlamann. |
| 2,803,230 | 8/1957 | Bensinger. |
| 2,849,992 | 9/1958 | Stillebroer et al. _____ 123—32 |
| 3,315,650 | 4/1967 | Bishop et al. _____ 132—32 |

LAURENCE M. GOODRIDGE, *Primary Examiner.*

U.S. Cl. X.R.

123—119, 127